Oct. 31, 1933.    M. W. McARDLE    1,932,746
ELECTRIC CIRCUIT INSTALLATION FOR APARTMENTS
Filed July 19, 1930
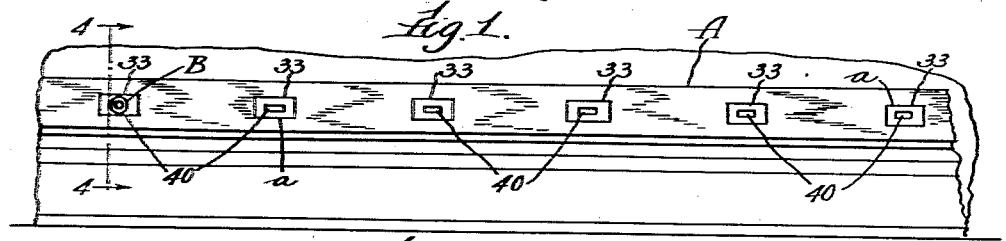
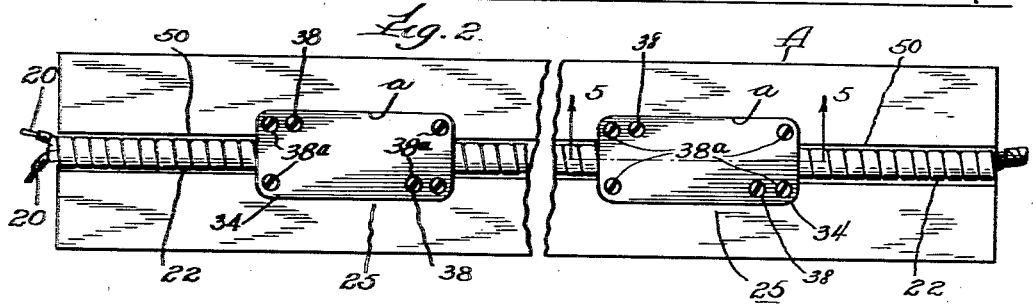
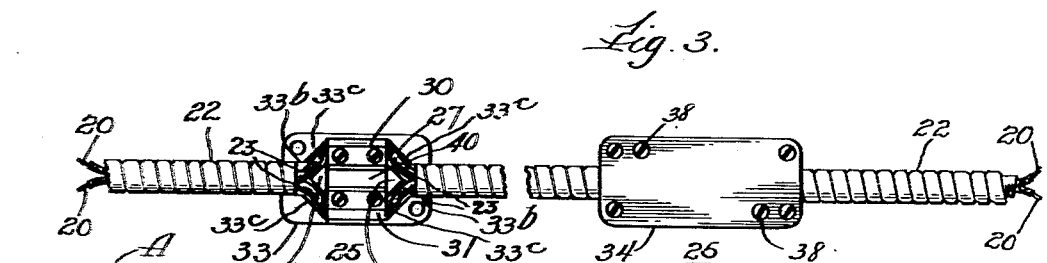
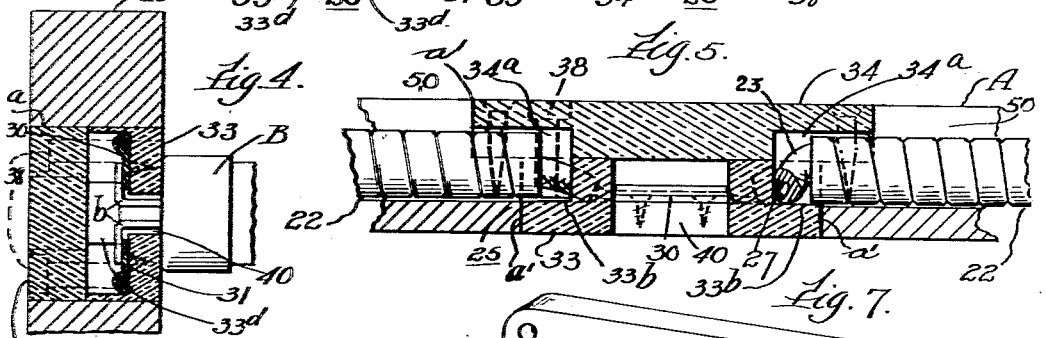
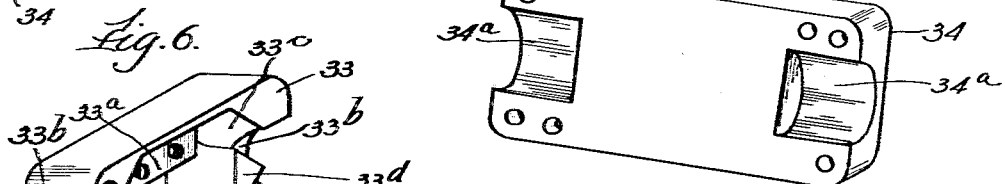
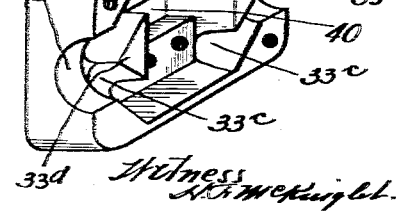
Inventor:
Michael W. McArdle.
by Burton & Burton
his Attorneys.

Patented Oct. 31, 1933

1,932,746

UNITED STATES PATENT OFFICE 1,932,746

ELECTRIC CIRCUIT INSTALLATION FOR APARTMENTS

Michael W. McArdle, Chicago, Ill.

Application July 19, 1930. Serial No. 469,107

2 Claims. (Cl. 247—3)

The purpose of this invention is to provide an electric circuit installation for apartments with outlets for circuit-connecting plugs adapted to have such outlets at short intervals in the extent of the installation which may extend entirely around the apartment or along only one or more sides thereof, and in which the circuit may be constituted by a customary two-wire cable encased in protective spirally formed flexible metal tubing. The invention consists in the elements and features of construction herein shown and described as indicated in the claims.

In the drawing:—

Figure 1 is an elevation of a limited portion of an installation embodying the invention, the same being shown mounted on the wall of the apartment at the upper edge of the base board.

Figure 2 is an inner side or rear elevation of the same detached from the wall.

Figure 3 is an elevation of a portion of a circuit embodying the invention, removed from the mounting member, the section comprising two outlets, with the covering member removed from one of them to show the interior construction.

Figure 4 is a section at the line 4—4 on Figure 2.

Figure 5 is a section at the line 5—5 on Figure 2.

Figure 6 is a perspective view of one of the mated members of the coupling which forms a housing for the contacts at the inlet.

Figure 7 is a perspective view of the other member of the coupling.

Referring to the drawing in detail:

The electric circuit arranged for installation by mounting in a mounting member which is arranged for mounting on the wall of the apartment served, is seen in Figure 3 separated from the mounting member, said circuit consisting of a two-wire cable of which the two wires encased in proper insulation, are indicated at 20, 20, the cable being enclosed in the customary manner in protective spirally formed and flexible metal tubing, indicated at 22. To provide for outlets at which a circuit-connecting plug may be connected, the protective tubing is interrupted at short intervals in the length of the circuit, as seen at 25, and within the limits of the interruption or gap in the protective tubing, the insulation, indicated at 23 of the two circuit wires, is interrupted, as indicated at 27, 27, for arranging said wires in conductive relation to contacts, 30, 31, respectively; and for housing and positioning the wires at the portions thereof at which the insulation and protective covering is interrupted, there is provided a device for coupling the insulation and protective tubing across the interruptions of said insulation and tubing respectively, this coupling device comprising two mated housing members, 33, 34, of any suitable rigid insulating material.

The coupling member, 33, is formed with a recess, 33$^a$, leading to a slot, 40, in the bottom of the recess; and upon opposite sides of the slot there are mounted at the bottom of the recess, contacts, 30, 31. At opposite ends of the member, 33, it is formed with longitudinally extending semi-cylindrical grooves, 33$^b$, 33$^b$, from the inner ends of which there are formed lesser grooves, 33$^c$, 33$^c$, diverging laterally to the outer sides of the recess, 33$^a$, leaving standing between them triangular bosses, 33$^d$, 33$^d$, of the insulating material of the coupling member. These lesser grooves, 33$^c$, 33$^c$, are dimensioned for accommodating the circuit wires with their insulation, and the portion of the circuit wires from which the insulation is removed is flexed to the lateral walls and bottom of the recess, 33$^a$, and there covered and held by the contacts, 30, 31, respectively, whereby the contacts are arranged in conductive relation to the circuit wires respectively. The mated and cooperating member, 34, of the coupling is formed at its opposite ends with semi-cylindrical grooves or recesses, 34$^a$, 34$^a$, dimensioned for seating the cable with the protective tubing and clamping it to the member, 33, and also to the mounting member, A, hereinafter more particularly described, said coupling member, 34, being longer than the coupling member, 33, for thus extending at both ends beyond the member, 33, to afford opportunity for securing the coupling in its entirety to the mounting member. For thus clamping the cable between the two members of the coupling, said two members are secured together by screws, 38, 38, set through the member, 34, and screwed into the member, 33, as seen in Figure 5.

The electric circuit constructed as described with the interruptions in the insulation and protective covering coupled across the interruptions by the two-membered coupling having the contacts conductively related to the bared circuit wires, and accessible through the slot for engaging by the terminal contacts of a suitable plug, is mounted in a mounting member, A, which, as shown, is a wooden bar adapted to be mounted upon the wall of the apartment and secured thereto in any convenient manner and by any convenient means. This bar has a longitudinal channel, 50, dimensioned for housing the two-wire cable enclosed in the customary manner in the protective spirally formed metal tubing, and is formed with recesses at intervals corresponding to the intervals between the interruptions in the insulation and protective tubing of the cable for accommodating the couplings in which the contacts are mounted in conductive relation to the bared circuit wires as described. The recesses for accommodating the couplings, indicated at $a$, are extended as complete apertures $a^1$, opening through the face of the member, A, to the extent of the dimensions of the coupling member, 33, of which the outer face, in which the slot, 40, is formed, is shown flush with the outer face of the mounting member, A. The extent of the recess, $a$, at the opposite ends of the aperture $a^1$, affords the seat mentioned for the ends of the longer coupling member, 34, and this seat affords engagement for the screws, $38^a$, $38^a$, which secure the coupling as an entirety in the mounting member.

Upon consideration of this construction it may be understood that the slots, 40, in the coupling member, 33, are calculated to admit the contact terminals of a circuit-connecting plug having its said terminals formed for hooking behind the contacts, 30, 31, as may be seen in Figure 4, in which such plug, B, is conventionally indicated, and shown having its terminals, $b$, adapted to be entered through the slot, 40, and rotated 90 degrees for engaging the hook ends of the terminal behind the contacts, 30, 31, respectively.

I claim:

1. A device for the purpose indicated comprising an insulating mount for a plural-wire encased cable of an electric circuit, said cable having its casing interrupted, and its wires bared for a short distance to expose the wires for conductive contact, said mount consisting of a block of insulating material recessed in one face and having in the opposite face intermediate opposite ends of the block a slot communicating with the recess and having in said opposite ends apertures communicating with the recess and having inwardly from and proximate to said apertures respectively protuberances projecting from the bottom of the recess formed and positioned for deflecting and holding spaced laterally from each other the bared portions of the circuit wires, and conductive clips secured to the recess bottom for clamping the bared portions of said wires to the recess bottom at opposite sides of the slot.

2. The construction defined in claim 1, the end apertures being notches, the combination with said mount of a cover for closing the recess having notches positioned for registering with said notches of the mount and dimensioned for cooperating with the mount notches for accommodating and definitely seating the encased portions of the cable.

MICHAEL W. McARDLE.